United States Patent [19]

Earl et al.

[11] Patent Number: 6,041,324
[45] Date of Patent: Mar. 21, 2000

[54] SYSTEM AND METHOD FOR IDENTIFYING VALID PORTION OF COMPUTER RESOURCE IDENTIFIER

[75] Inventors: Joel Ray Earl, Rochester; David John Goodman, Byron; George Wayne Nation, Eyota, all of Minn.

[73] Assignee: International Business Machines Corporation, Armonk, N.Y.

[21] Appl. No.: 08/972,106

[22] Filed: Nov. 17, 1997

[51] Int. Cl.[7] .................................................. G06F 17/30
[52] U.S. Cl. ................................ 707/9; 707/10; 707/104; 709/219
[58] Field of Search .................................. 707/1, 100, 10, 707/200, 501, 2, 104, 9, 533; 709/228, 218, 219, 245, 205; 395/200, 188; 705/14, 26; 345/357, 356, 973, 333; 358/448; 380/4, 25

[56] References Cited

U.S. PATENT DOCUMENTS

| | | | |
|---|---|---|---|
| 5,388,213 | 2/1995 | Oppenheimer et al. | 395/200 |
| 5,678,041 | 10/1997 | Baker et al. | 707/9 |
| 5,745,752 | 4/1998 | Hurvig et al. | 707/200 |
| 5,764,906 | 6/1998 | Edelstein et al. | 709/219 |
| 5,812,769 | 9/1998 | Graber et al. | 395/200 |
| 5,848,413 | 12/1998 | Wolff | 707/10 |
| 5,854,901 | 12/1998 | Cole et al. | 395/200 |
| 5,864,676 | 1/1999 | Beer et al. | 395/200 |
| 5,870,546 | 2/1999 | Kirsch | 709/205 |
| 5,913,215 | 6/1999 | Rubinstein et al. | 707/10 |

Primary Examiner—Wayne Amsbury
Assistant Examiner—Thu-Thao Havan
Attorney, Agent, or Firm—Steven R. Funk

[57] ABSTRACT

A system and method for receiving and validating user input for a computer resource entered into a computing system or network, and distinguishing valid and invalid portions of the user input. The invalid resource identifier, which ranges from a least specific portion to a most specific portion, is partitioned into a plurality of fields. At least one of the fields corresponding to the most specific portion of the invalid resource identifier is removed from the invalid resource identifier to create a modified resource identifier, wherein the modified resource identifier is used to attempt to access a higher level computer resource. The fields corresponding to the most specific portion of the resource identifier are removed until the modified resource identifier proves to be a valid resource identifier which can access a computer resource. The valid resource identifier is distinguished from the invalid resource identifier entered by the user, so that the user can easily determine a point at which the input is invalid.

40 Claims, 15 Drawing Sheets

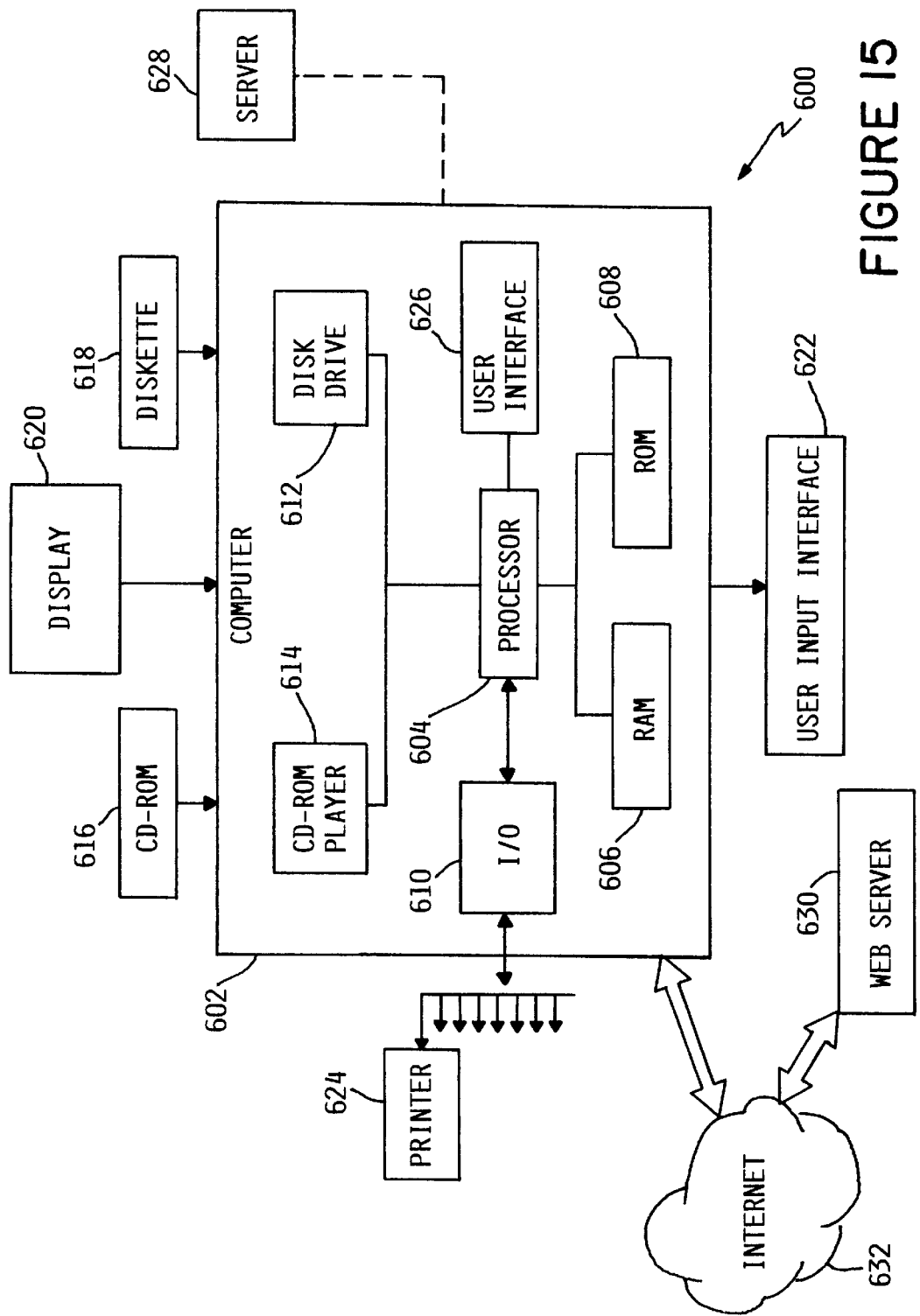

SYSTEM AND METHOD FOR IDENTIFYING VALID PORTION OF COMPUTER RESOURCE IDENTIFIER

FIELD OF THE INVENTION

The present invention relates generally to computer or data processing systems. More particularly, the present invention relates to a system and method for receiving and validating user input for a computer resource entered into a computing system or network.

BACKGROUND OF THE INVENTION

Information input and output are essential components of any computing system, as it provides a means by which computers and computer users can communicate. Virtually every computer processes data, and input is the mechanism to get unique data to the programs operating under the control of the computing system. The computer interface is the point—whether logical or physical—at which the computer and a peripheral connect. For example, keyboards, pointing devices, etc. are often used as a user interface for a user to input some form of text or other information to the computer system.

Computer systems often provide a means for which the user can enter an identifier of a desired resource. The desired resource can be any information related to a computer or computer network (i.e., computing system) that is used to control the computing system or that is stored within the computing system. For example, a desired resource may be specified by interacting with a command interpreter, often referred to as a command "shell". Generally, a command interpreter or shell is a program which reads textual commands from the user or from a file and executes them. Users enter commands, or other "identifiers" of a desired computer action, at a user interface so that a command interpreter or similar device can receive the commands for execution. The commands typically take the form of a character string identifying a specific action for which the computer should take, and may include many command "arguments" which either modify the action performed or supply it with additional input. Such commands and accompanying arguments often result in long character strings which are entered by the user.

Another desired resource may be a stored file in a computer memory or storage medium. Users enter identifiers (i.e., addresses) which specify which of the files is being sought. The user must enter the filename of the desired file, along with any preceding directory and sub-directory information. Similarly, the Internet is designed so that identifiers such as URLs (Uniform Resource Locators) can be entered by a user to locate the desired Internet resource. Because of the enormous amount of information available on the Internet and the potentially large number of files and directories configured on storage mediums, these types of identifiers (addresses, URLs, etc.) can also prove to be lengthy character strings. Other similar types of identifiers or addresses in computer systems also require computer users to enter comprehensive and intricate textual strings.

If any portion of the entered identifier proves to be incorrect, prior art computer systems simply indicate that the identifier is invalid, without indicating what portion, if any, of the identifier is valid. Typically, a user then carries out a trial-and-error procedure where the user removes the most specific portions of the identifier until a higher level identifier is found to be correct. Each of the removed portions is then reapplied to the high level identifier, one at a time, until the system indicates that the address is entered correctly. This method can be extremely cumbersome and time-consuming.

It would therefore be advantageous for a computer user interface to provide a means for which a lengthy character string would not have to be completely re-entered if an entry error occurred, and to help the user determine how to correct the faulty character string. It would also be beneficial to the user to be notified of the point of error so as to assist the user in analyzing whether the error was a typographical error or whether the user was not in possession of a valid identifier. Further, it would be beneficial to have the user interface or entry field automatically locate and position a cursor or other line entry identifier at the point where correction should be made. The present invention provides a solution to these and other problems, and offers other advantages over the prior art.

SUMMARY OF THE INVENTION

The present invention relates to a system and method for receiving and validating user input for a computer resource entered into a computing system or network, and for distinguishing valid and invalid portions of the user input.

In accordance with one embodiment of the invention, a method for determining a valid portion of an invalid resource identifier entered by a user is provided. The resource identifier is an address or other identifier which is used to access a computer resource in a computing system. The resource identifier entered by the user is determined to be invalid as a result of having no corresponding resource addressable by the entered resource identifier. The invalid resource identifier, which ranges from a least specific portion to a most specific portion, is partitioned into a plurality of fields. At least one of the fields corresponding to the most specific portion of the invalid resource identifier is removed from the invalid resource identifier to create a modified resource identifier, and the modified resource identifier is used to attempt to access a higher level computer resource. The fields corresponding to the most specific portion of the resource identifier are removed until the modified resource identifier proves to be a valid resource identifier which can access a computer resource. The valid resource identifier is distinguished from the invalid resource identifier entered by the user, so that the user can easily determine a point at which the input is invalid.

In accordance with another embodiment of the invention, a computing system for determining a valid portion of a desired resource identifier is provided. The desired resource identifier is intended to access a targeted computer resource within a computer or network, but has failed to access the targeted computer resource. The system includes memory that is configured to store a plurality of system resource identifiers, wherein the memory can be centralized or distributed throughout multiple computers in a network. A user interface allows a user to enter the desired resource identifier. A processor cooperates with the user interface to truncate predefined portions of the desired resource identifier until a resulting modified resource identifier is identified as a valid resource identifier. A valid resource identifier is one which is included within at least one of the system resource identifiers. A display device displays the valid resource identifier in relation to the desired resource identifier entered by the user.

In accordance with yet another embodiment of the invention, a computing system for determining a valid portion of an invalid Uniform Resource Locator (URL) is provided. A URL is used to access a targeted network resource within a computer network, such as the Internet. The computing system includes a client computer, which includes a user interface to allow a user to enter the desired URL, and a display device to display the desired URL entered by the user. The computing system also includes a network server, which includes memory configured to store multiple available URLs. This memory may be centralized within the network server, or distributed throughout multiple servers within the network. The server further includes a processor configured to remove predefined portions of the desired URL until a resulting modified URL is identified as a valid URL included within at least one of the available URLs.

In accordance with another aspect of the invention, a method for determining a valid portion of an invalid database request entered by a user is provided. The invalid database request is a request intended to access a particular one or more computer database records in a computing system. The database request, which ranges from a least specific portion to a most specific portion, is partitioned into plurality of fields. At least one of the fields corresponding to the least specific portion of the invalid database request is introduced into an evaluation field string, and the evaluation field string is tested for validity. Further fields are introduced into the evaluation test string until the evaluation field string is found to be invalid. The valid portion of the evaluation field string, which includes the evaluation field string at the time prior to the introduction of the invalidating field, is identified to the user.

These and other features and advantages of the present invention will become readily apparent to those skilled in the art from the following detailed description and corresponding drawings. As will be realized, the invention is capable of modification without departing from the invention. Accordingly, the drawing and description are to be regarded as illustrative in nature, and not as restrictive.

BRIEF DESCRIPTION OF THE DRAWINGS

FIG. 15 is an example of a computing system in which the present invention can be incorporated.

DETAILED DESCRIPTION OF THE ILLUSTRATED EMBODIMENTS

As previously described, prior art identifier entry interfaces indicate that an identifier is invalid where any portion of the entered identifier proves to be incorrect. These systems do not indicate what portion of the identifier, if any, is valid. Many computer systems offer features commonly referred to as "command completion" and "filename completion". Command completion allows the user to enter a portion of a command name followed by a special keystroke that instructs the system to complete the command name. Upon receipt of the special keystroke, the system searches the available commands for those whose names begin with the command portion provided by the user. In the event that only one command includes the command portion, the system will fill in the remainder of the command name and position the cursor at the end of the command name, as if the user had typed the entire command. In the event that more than one command is matched by the portion, the system will fill any additional portion of the command name that is common to all the matching commands, and move the cursor to the end of this newly added portion. In either case, the system then allows the user to continue entering the command or to modify the portion filled in by the system.

Figure 1:
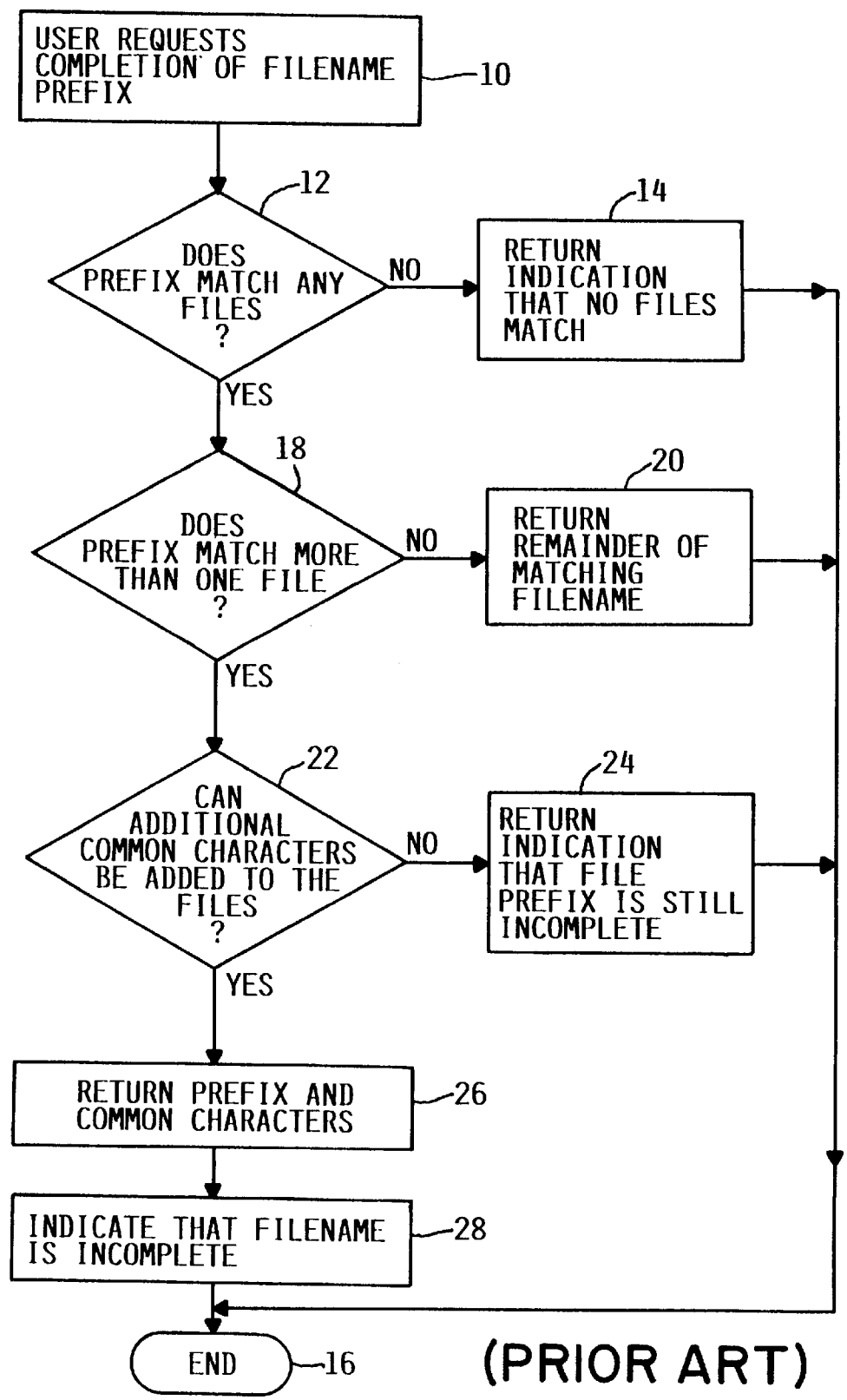
FIG. 1 is a flow diagram of a prior art file completion process.

File completion is similar, except that it deals with the specification of file names rather than command names. As illustrated in FIG. 1, such a prior art system allows the user to enter a prefix portion of a file name, followed by some special keystroke to request completion of this prefix, as shown at step 10. Upon receipt of this keystroke, the system will search the available files, and determine 12 whether any files begin with the prefix provided by the user. If no files match, an indication is provided 14 to that effect, and processing ends 16. In the event that only one file name matches as determined at step 18, the system will fill in the remainder of the file name at step 20 and position the cursor at the end of the file name, as if the user had typed it. In the event that more than one file name is matched by the portion, it is determined 22 whether additional common characters can be added to the files. If no common characters can be added, the system indicates 24 that the file prefix is still incomplete. If all the file names matching the entry have a common prefix beyond the portion matched by the supplied prefix, the system will add the remainder of this common prefix to the supplied prefix as if the user had typed it, as seen at step 26, and it is indicated 28 that the filename is still incomplete. Whether or not common characters are supplemented, the system allows the user to continue entering the file name or to modify the portion filled in by the system.

Figure 2:
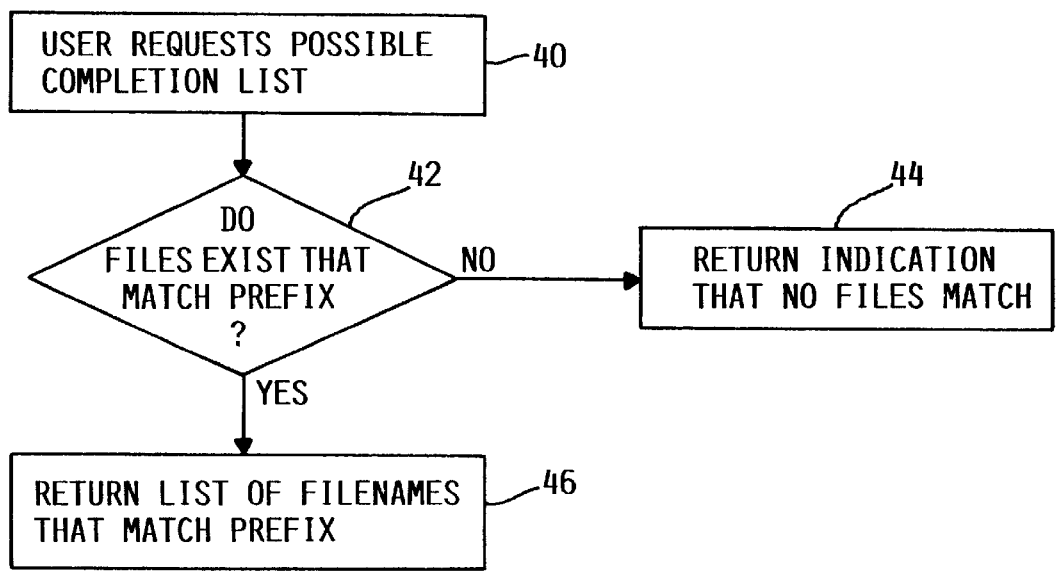
FIG. 2 is a flow diagram of a prior art method for displaying potential file completions.

Implementations of command completion and file name completion may include an additional feature where the possible completions are displayed. This is useful where more than one command or file name is matched by the portion provided. A special keystroke causes the system to display the names matching the entered portion of the command or file name, so that the user can easily determine what additional portion of the name must be entered to more uniquely specify the desired name. A prior art method for displaying the potential completions is illustrated in the flow diagram of FIG. 2. At step 40, the user requests a completion list, and the system determines 42 whether any files exist that match a prefix of the desired command or file name entered by the user. The system returns an indication 44 that no files match is a match is not found. Where one or more files or commands include the prefix entered by the user, a list of those command or file names which match the prefix are returned at step 46.

These types of systems, however, do not automatically determine the incorrect portion of an identifier and automatically direct the user to the relevant editing position, from which position editing can occur or possible completions can be displayed. Therefore, the present invention allows an address, command, URL or other identifier to be analyzed for partial accuracy, and allows the valid portion to be conclusively identified. A user can then request valid completions for a partially correct identifier.

Figure 3:
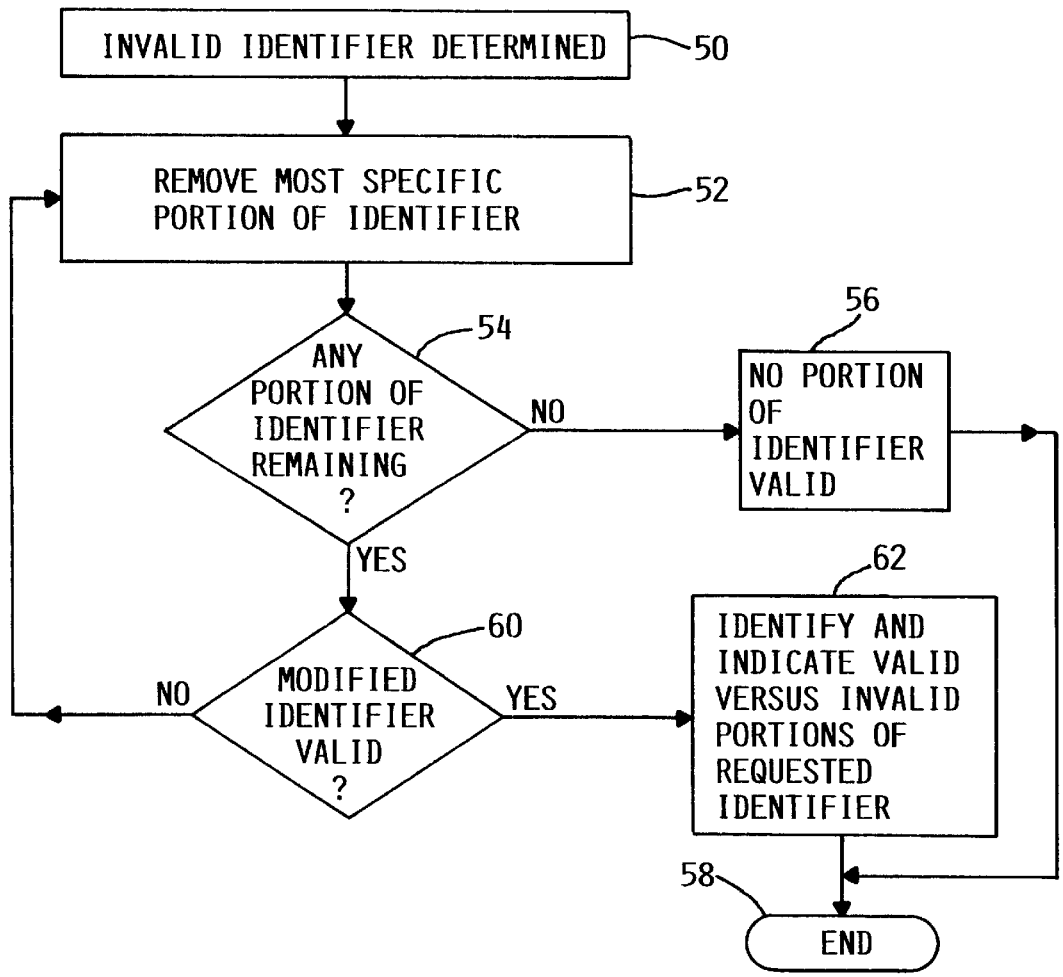
FIG. 3 is a flow diagram of an identifier resolution operation in accordance with one aspect of the present invention.

Referring now to FIG. 3, a flow diagram of one aspect of the invention is provided. The "identifier" referred to in FIG. 3 represents a user input variable including a string of characters that is used to identify or locate a particular computer resource. As will be described more fully below, this identifier may take the form of a memory address or other device address, a command, or a network address such as a URL.

When an identifier is found to be invalid at step 50, the system initiates an identifier resolution operation. The most specific portion of the identifier is removed 52 from the incorrect identifier entered by the user. For example, the most specific portion of a file path which includes a hierarchy of a number of directories followed by a file name would be the file name. This assumes that the "portion" has been predefined to include fields corresponding to the directories and file names. Alternatively, the "portion" could be defined as each individual character in the file path character string. Therefore, the most specific portion to be removed can correspond to the name of the lowest-level hierarchical object for a hierarchical identifier, or it can be some subset of that name, such as a single character. Selecting a portion based on the name of the lowest-level hierarchical "object" may provide an improved response time over the selection of single characters.

The remaining portion of the identifier (hereinafter the "modified identifier") is then tested for validity at steps 54 and 60. At step 54, it is determined whether any identifier remains after removing the most specific portion of the requested identifier. If not, then the system reports 56 that no portion of the requested identifier is valid, and processing ends 58. If a modified identifier can be created, however, it is then determined at test step 60 whether that modified identifier is valid. If it is not valid, the system returns to step 52 where yet another portion of the modified identifier is removed. In one embodiment of the invention, the removal process continues to remove the most specific portion of the modified identifier, thereby creating another modified identifier which will be more generic (i.e., a higher level of abstraction) than the previous one. In other words, an identifier is a subset of the more generic identifier that is created upon removing the most specific portion of that identifier. This will be described in greater detail in connection with FIG. 4.

The identifier resolution operation continues to remove the most specific portions of the initially requested identifier until no portion of the identifier is valid, as shown at step 56, or until a modified identifier is found to be valid at test step 60. This test can take various forms, depending on the nature of the identifier. In one embodiment of the invention, this test is effected by comparing the modified identifier with identifiers of the type requested. For example, where the identifier is a file path, the modified file path is compared to existing file paths in the file memory being searched. As is known to those skilled in the art, this comparison can be performed via hardware, firmware, or preferably via a software comparison routine.

If a modified identifier is found to be valid, the system returns an identification of the valid portion of the requested identifier, as shown at step 62. In one embodiment of the invention, this identification is provided by distinguishing the valid portion in reference to the requested identifier. For example, the requested identifier can be displayed in a display window with the valid portion distinguished from the entire requested identifier using distinguishable features such as fonts, character size, color, underlining, background attributes, reverse video, etc. As will be readily apparent to those skilled in the art, other distinguishing characteristics can be used without departing from the spirit and scope of the invention. Alternatively, a cursor may be automatically inserted at the boundary between the valid and invalid portions of the requested identifier in a text entry field, so that the user can edit the identifier from the automatically positioned cursor position. This helps the user focus the effort of correcting the identifier on that portion which is not valid, or to start at the object corresponding to the valid portion of the identifier in searching for the correct version of the invalid portion.

Figure 4:
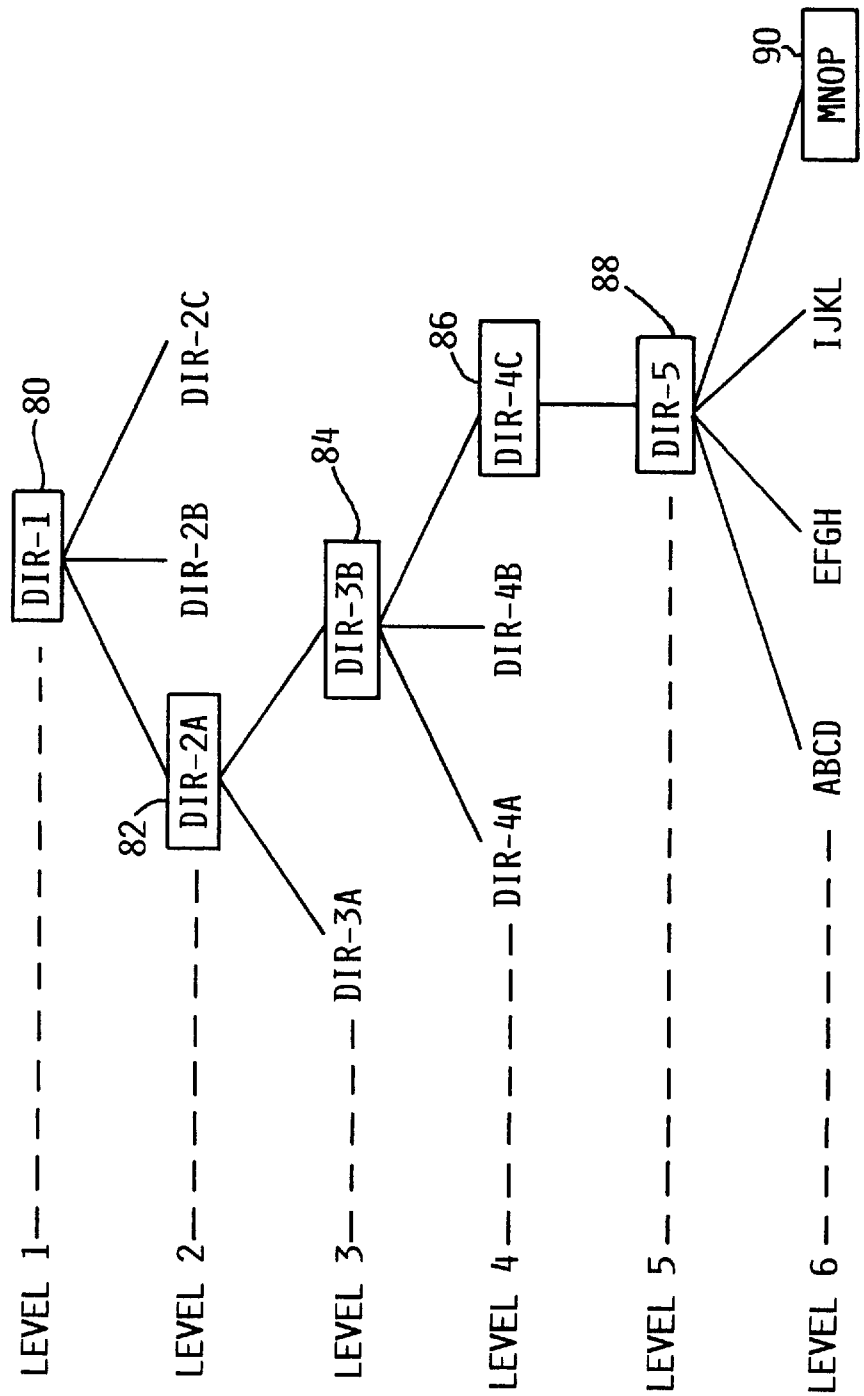
FIG. 4 illustrates an example of an file path identifier hierarchy.

Referring now to FIG. 4, an example of an identifier hierarchy is provided. The example of FIG. 4 refers to a file path identifier, however this example is equally applicable to other types of identifiers such as URLs and commands. The file path hierarchy of FIG. 4 has six levels, labeled level 1 through level 6. Where a user wants to access a file named MNOP, an entry could be entered into a filename entry field as shown in Example 1 below:

DIR-1\DIR-2A\DIR-3B\DIR-4C\DIR-5\MNOP        [Ex. 1]

Each of the six levels corresponds to a hierarchical object, moving from the least specific (level 1) to the most specific (level 6). Each of these hierarchical objects are depicted in FIG. 4, labeled DIR-1 80, DIR-2A 82, DIR-3B 84, DIR-4C 86, DIR-5 88, and MNOP 90. Where the most specific portion of a file path is removed at step 52 of FIG. 3, the removal therefore begins at level 6 of the current example, thereby removing object MNOP 90. Therefore, after the most specific portion of the requested identifier has been removed for the first time, the resulting modified identifier would appear as shown in Example 2 below:

DIR-1\DIR-2A\DIR-3B\DIR-4C\DIR-5        [Ex. 2]

Because the "portion" has been defined to be a hierarchical object rather than a single character in this example, the most specific portion removed is the file name MNOP. The remaining portion is then again tested, and the removal process continues to remove the most specific portion of the modified identifier until no portion of the identifier is valid, or until a modified identifier is found to be valid. Had the user entered DIR-40C rather than DIR-4C in the text entry field, the valid portion returned would appear as shown in Example 3 below:

DIR-1\DIR-2A\DIR-3B [Ex. 3]

Figure 5:
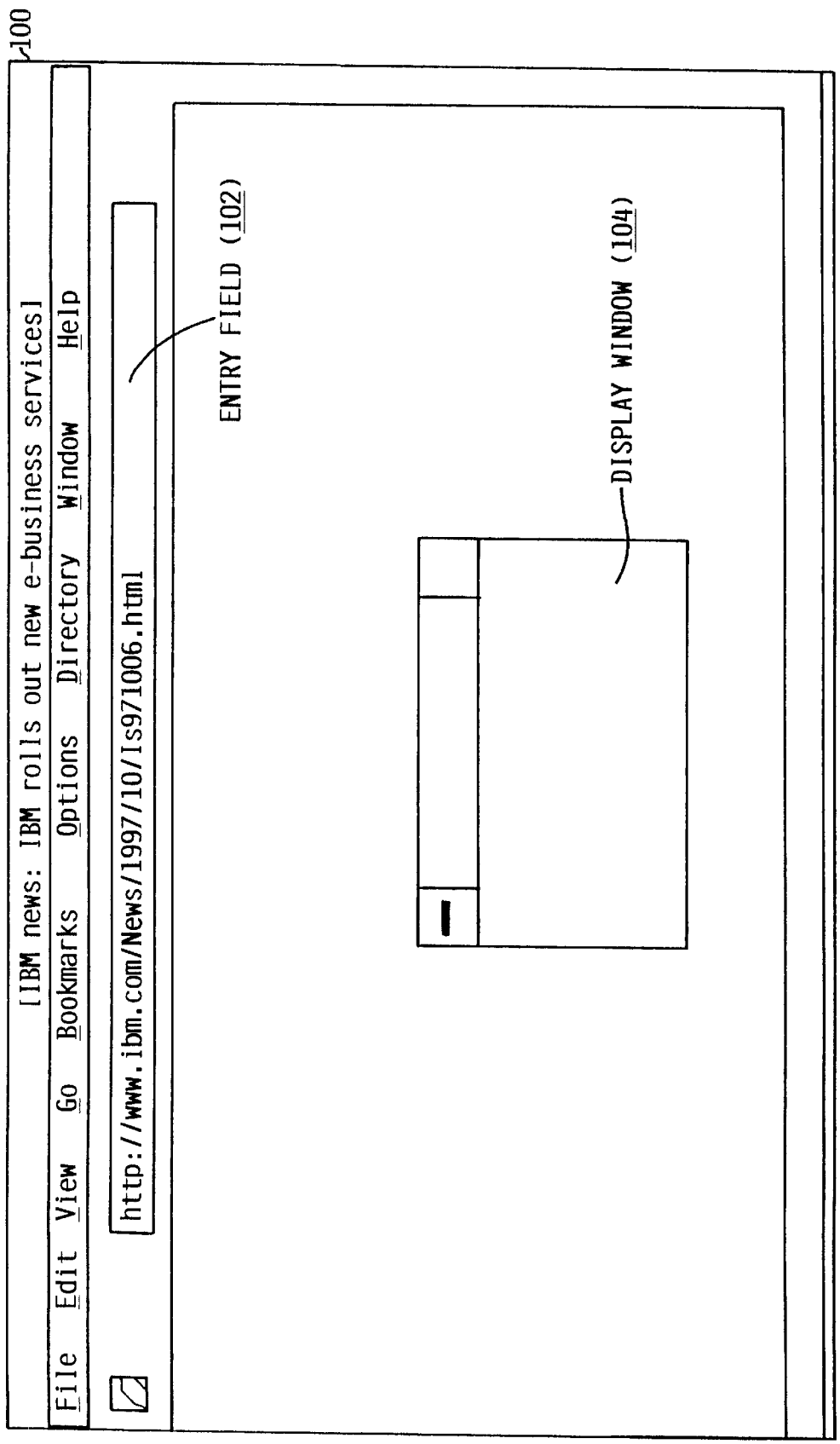
FIG. 5 illustrates one embodiment of a user interface window for entering desired identifiers and displaying an indication of the valid portion of the desired identifier.

Referring now to FIG. 5, an example is provided of a user interface window 100 that allows a user to input a desired identifier, and which can provide an indication of the valid portion of the desired identifier. Within the user interface window 100 is an entry field 102, where a user can input a desired identifier, which in this example is a URL entry to access a resource via the Internet. Upon submitting the URL, the URL is checked for validity. If found to be invalid, the URL is analyzed as described in connection with FIG. 3 to ascertain what portion of the URL, if any, is valid. If a portion is determined to be valid, the system returns an identification of the valid portion of the requested identifier as referenced against the requested URL. In one embodiment of the invention, this is accomplished by providing a display window 104, which displays the requested URL, and distinguishes the valid portion from the invalid portion, so that the user knows precisely where the invalid portion of the original entry begins. In another embodiment of the invention, the system distinguishes the valid portion from the invalid portion of the requested URL in the entry field 102.

Figure 6:
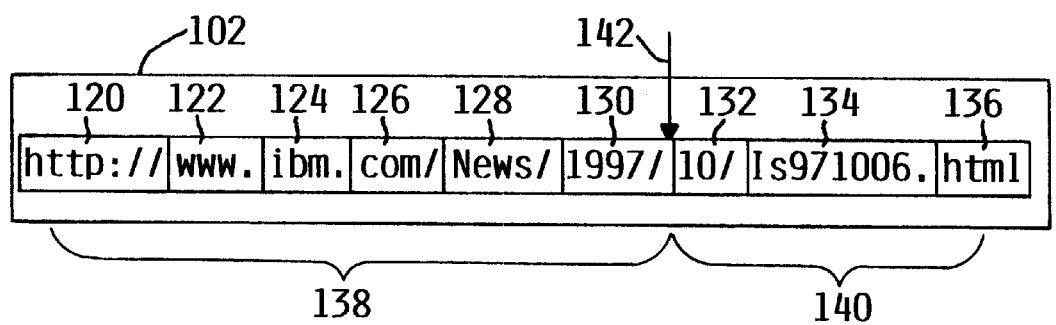
FIG. 6 illustrates one manner in which the system distinguishes the valid portion from the invalid portion of an identifier in the text entry field.

FIG. 6 illustrates one manner in which the system distinguishes the valid portion from the invalid portion of an identifier, such as a URL, in the text entry field 102. An original requested URL in the entry field 102 includes various objects or fields arranged in a hierarchy of specificity, ranging from field 120 to field 136. As the URL is analyzed as described in connection with FIG. 3, and the requested URL is not valid, the fields are removed until a valid, higher level URL is established. For example, fields 136, 134 and 132 may be removed and the remaining URL including fields 120, 122, 124, 126, 128 and 130 may be found to be valid. The present invention identifies the boundary between the valid portion 138 and the invalid portion 140 of the requested URL. In one embodiment of the invention, this can be accomplished by moving the user interface entry cursor to the boundary location identified by arrow 142. In this way, the user can simply begin editing from the inserted cursor position.

There are many computer-related embodiments in which the present invention can be applied. In order to illustrate various embodiments of the invention, the following examples are provided. While the invention is described in the context of the following examples, other embodiments are possible without departing from the scope and spirit of the invention as will be readily apparent to those skilled in the art from the ensuing description of the various embodiments of the invention.

Figure 7:
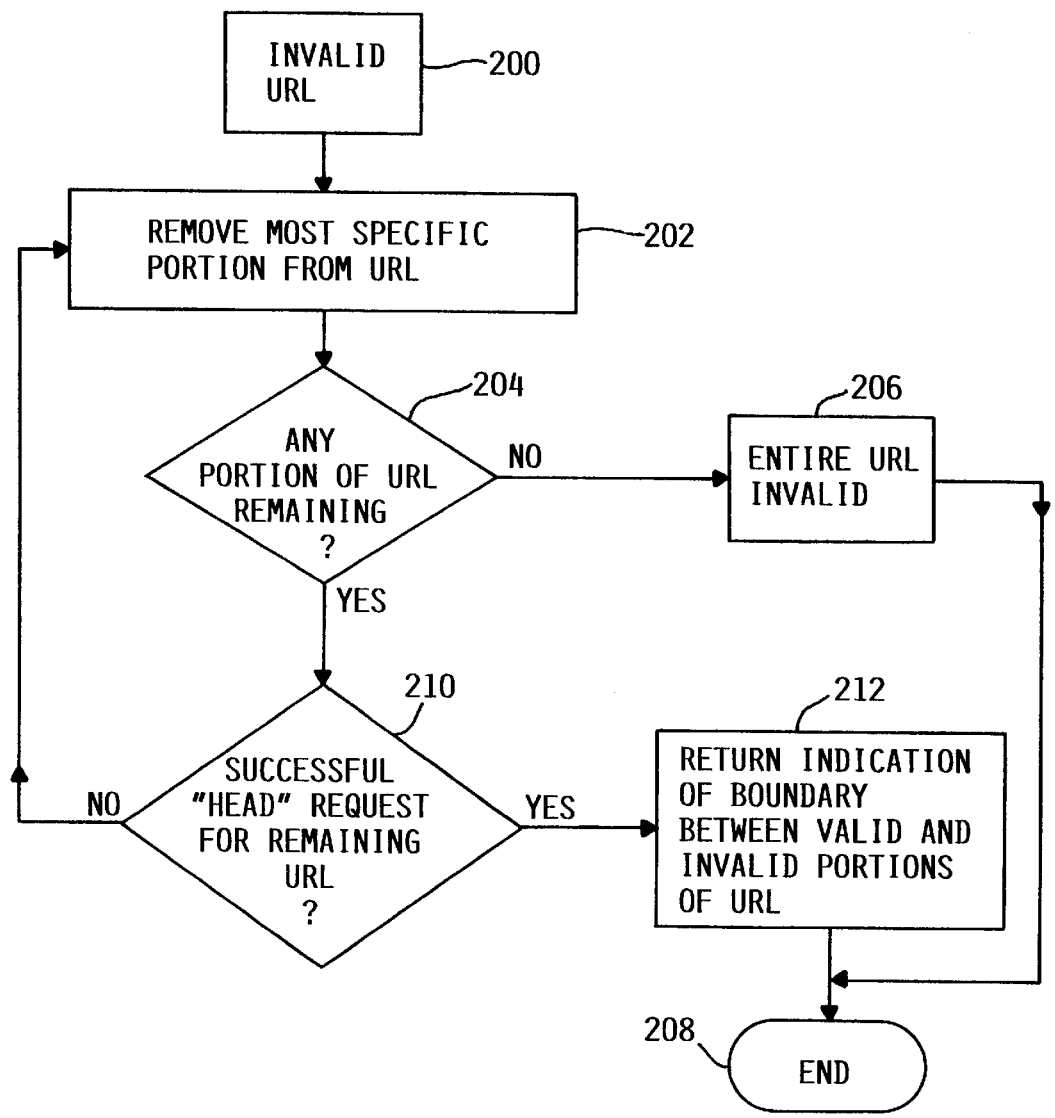
FIG. 7 is a flow diagram illustrating the manner in which a web browser performs a Uniform Resource Locator (URL) resolution operation in accordance with the present invention.

FIG. 7 is a flow diagram of one embodiment of the invention where a web browser performs a URL (Uniform Resource Locator) resolution operation in accordance with the present invention. A URL is used to locate a resource in a network environment such as the Internet, and is essentially an address for an object that can be accessed by the web browser. A web browser is a client program that is used to access various kinds of Internet resources from remote web servers. It allows a user to read hypertext, and gives some means of viewing the contents of nodes (or "pages"), and of navigating from one node to another.

For the purposes of this description, the user interface of a web browser includes at least two components. First, a display window is provided for displaying the contents of a URL, an error message, or other communication from the browser to the user. Such a display window was illustrated as display window 104 in FIG. 5. Second, an entry field, such as entry field 102 of FIG. 5, is provided to allow the user to enter a URL to be loaded.

When the user enters a URL for the browser to fetch, the browser sends the request to the server and waits for a response. The response is either the content of the requested URL, or an error message. If the error message is "File Not Found" (e.g., HTTP status code 404), existing browsers will simply display the error message to the user, and wait for further user action. A browser equipped with the present invention will instead display a "resolving incorrect URL" message, and initiate the resolution operation shown in FIG. 3. If the user does not wish to wait for the resolution process, activating the "Stop" button (or any other means the browser provides to interrupt an operation) will stop the resolution process, and display the standard "File not found" message.

For each iteration of the resolution operation, the browser will remove the rightmost (most specific) element of the incorrect URL, and send a HEAD request for this modified URL to the server. HTTP (HyperText Transfer Protocol) defines a HEAD request for obtaining information about a document, without the additional overhead of obtaining the document itself. The server will respond normally to these requests by sending header information for the requested URL if it is available, or by sending a status code 404 if the requested URL is not available. If the server sends the header information, then the URL is considered valid. The browser uses a pointer to position the cursor in the URL entry field between the valid and invalid portions of the URL.

Referring again to FIG. 7, one embodiment of the aforementioned process is provided where a web browser performs a URL resolution operation. When a URL is deemed invalid at step 200, the browser initiates the URL resolution operation by removing 202 the most specific portion of the URL. If no portion of the requested URL is found to be valid, the browser will display a message 206 in the display window that the entire URL is invalid, and processing of the URL resolution operation will end 208. If any portion of the URL exists after removing a portion at step 202, the remaining portion of the URL is tested for validity at step 210 by sending a HEAD request for this modified URL to the server. If the modified URL is not valid, processing returns to step 202 where the next most specific portion of the modified URL is removed. This removal and validity testing process continues until no portion of the URL is remaining, or until the modified portion of the URL is valid.

Where the validity test at step 210 is successful, an indication is returned that identifies the boundary between the valid and invalid portions of the URL, as shown at step 212. The boundary identification can be used to position the cursor in the URL entry field between the valid and invalid portions of the URL. Optionally, the browser will also display in the display window a message indicating that the URL is partially valid, and use some form of indication to distinguish the valid and invalid portions. This indication can be in the form of a visual indication, such as distinguishable fonts, character size, color, underlining, and could even take the form of an audible indication. As will be readily apparent to those skilled in the art, other distinguishing characteristics can be used without departing from the spirit and scope of the invention.

The valid portion can also be converted to a hypertext link to the URL corresponding to the valid portion. Hypertext is text that has hyperlinks. In terms of the Internet, a hyperlink is a link in an HyperText Markup Language (HTML) document that leads to another World Wide Web site, or another place within the same document. Hyperlinks are usually underlined or shown in a different color from the surrounding text, and are sometimes in graphical form. When hypertext is viewed with an interactive browser, certain words appear as highlighted by underlining or color, and selecting the highlighted link leads to another resource location.

Figure 8:
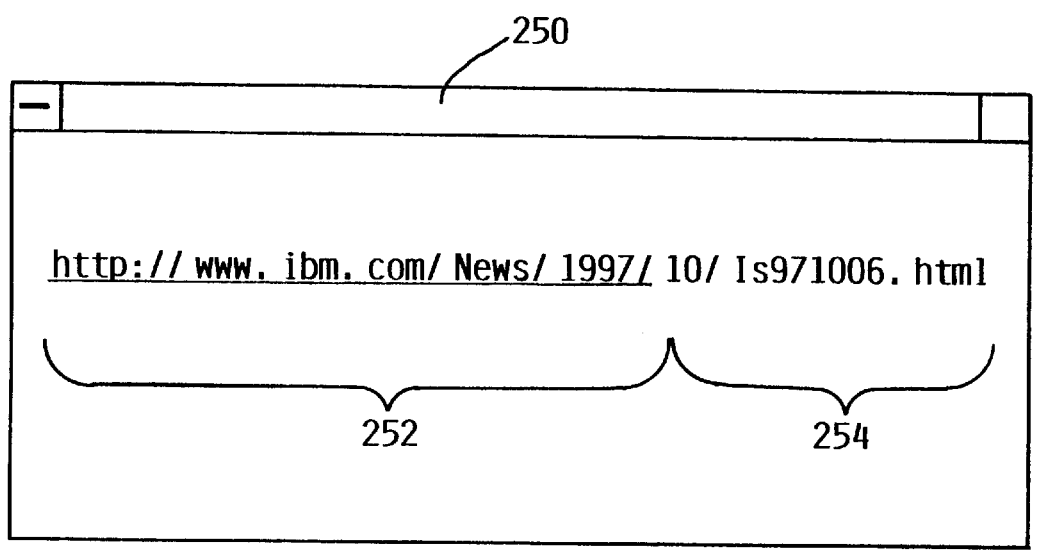
FIG. 8 is an illustration of a display window used to provide a hypertext link to the valid portion of a requested URL.

FIG. 8 is an illustration of a display window 250 used to provide a hypertext link to the valid portion of a requested URL. Alternatively, the hypertext link could be placed in the URL entry field, rather than in the display window 250. The valid portion of the requested URL is depicted by the fields comprising portion 252, where the hypertext link is distinguished from the invalid portion 254 by visual distinctions. In this embodiment of the invention, the valid portion 252 is presented in bold typeface, and is underlined. Selecting this portion via user input selection would lead to the URL corresponding to the valid portion 252. Automatic presentation of such a hypertext link in accordance with the present invention allows a user to link to the most specific valid URL, where the requested URL was not valid for any reason.

A network server, rather than the web browser which is a client of the web server, could be equipped with the present invention. The network server, such as an Internet web server, returns an indication that a URL is invalid at step 300 when the requested URL is not available. In the Internet setting, a web server typically returns an HTTP status code 404 error—"File not found" when the URL is not available. Alternatively, some existing web servers return a search page for that site when an invalid URL is requested. Neither of these methods point out incorrect and correct portions of the URL, and they require the user to essentially start over, whether by entering the complete URL or searching from a search page.

Figure 9:
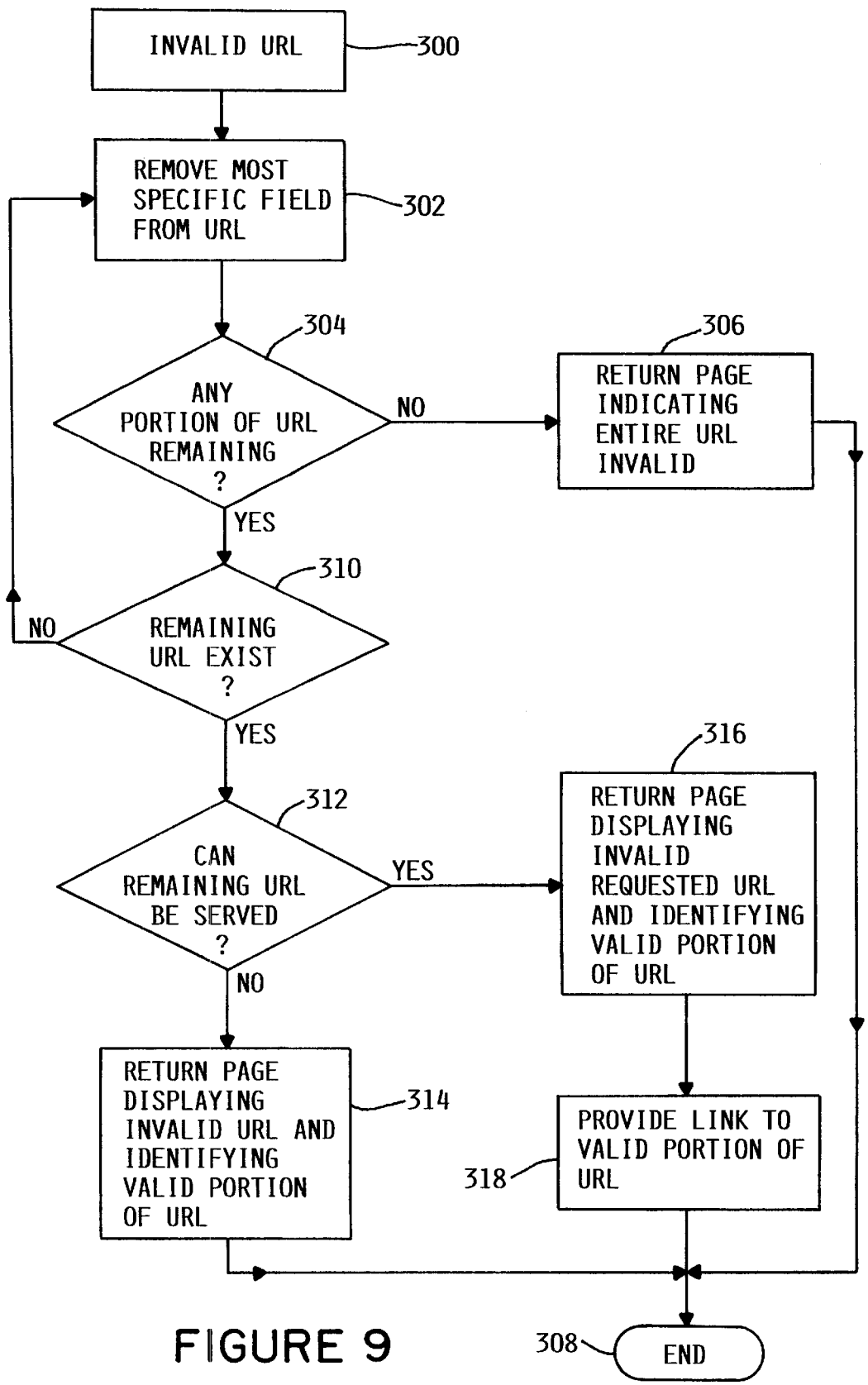
FIG. 9 is a flow diagram illustrating the manner in which a web server performs a URL resolution operation in accordance with the present invention.

Referring now to FIG. 9, a flow diagram of an embodiment of the invention is provided wherein a web server performs a URL resolution operation in accordance with the invention. The server initiates the URL resolution operation by removing 302 the most specific portion of the URL, and if no portion of the requested URL is found to be valid at step 304, the server will generate a page 306 indicating that the entire URL is invalid, and processing will end 308. If any portion of the URL exists after removing a portion at step 302, the remaining portion of the URL is tested for validity at step 310. If the modified URL is not valid, processing returns to step 302 where the next most specific portion of the modified URL is removed. This removal and validity testing process continues until no portion of the URL is remaining, or until the modified portion of the URL is valid.

Where the validity test at step 310 affirms the existence of the modified URL, the server determines 312 if it can be served to the requesting client. If it can not be served, a page is generated containing a message including the incorrect URL and the valid portion of the requested URL, which is provided to the requesting client as illustrated at step 314. If the modified URL can be served, a page is returned 316 containing a message including the incorrect URL as well as the valid portion of the URL, and a link to the valid portion of the URL is provided at step 318.

Other computer-related embodiments in which the present invention can be applied include user input of commands to a computer system. Generally, a command takes the form of a character string identifying a specific action for which the computer system should take, and may include command arguments which either further define the action or supply it with additional input. Commands can be entered into a computer system in various manners, including through command interpreters and command-line-driven applications.

Figure 10:
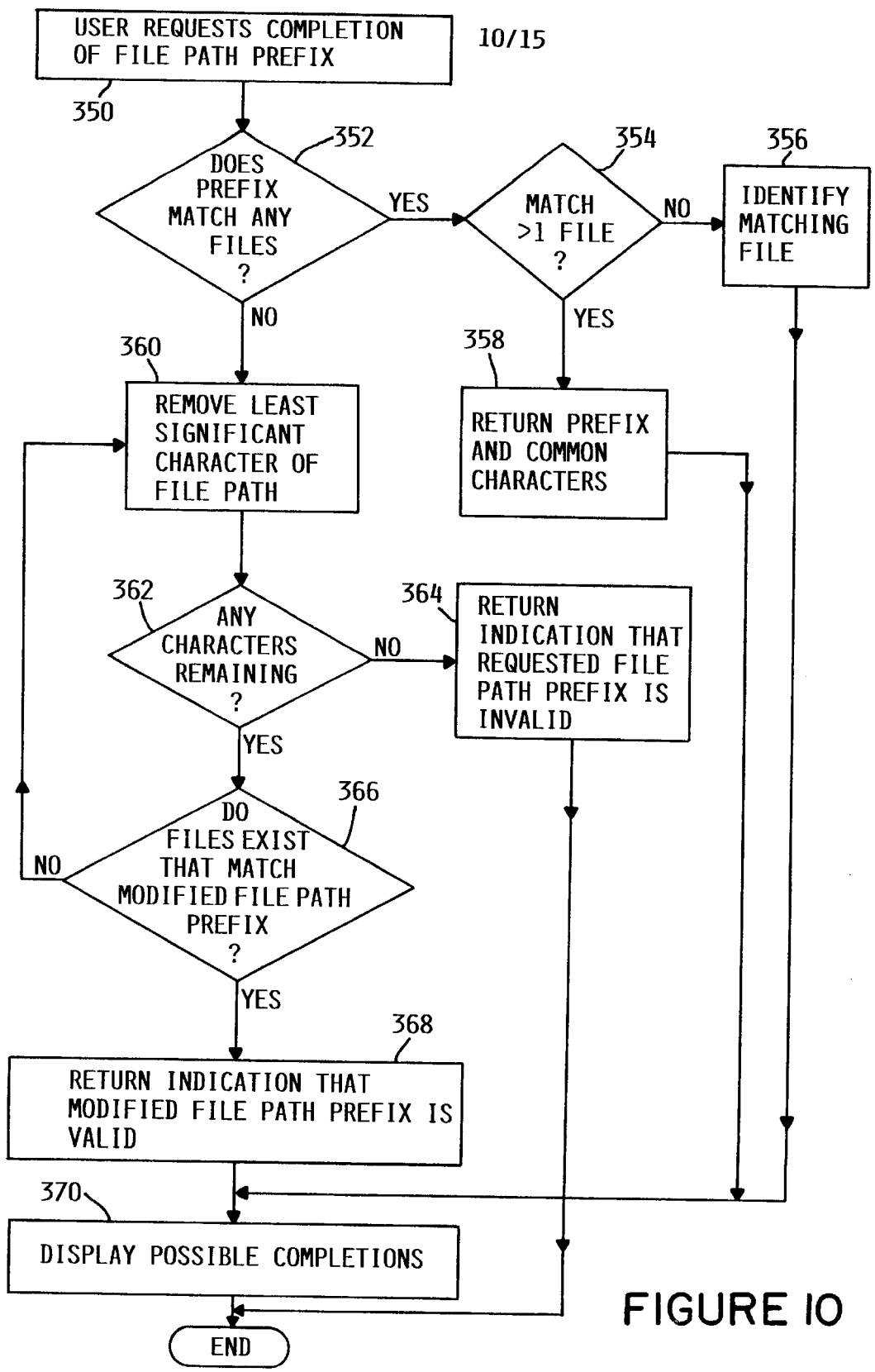
FIG. 10 is a flow diagram illustrating the manner in which a command shell performs a file path resolution operation in accordance with the present invention.

FIG. 10 is a flow diagram of an embodiment of the invention where a command shell performs a file path resolution operation in accordance with the present invention. A command shell is a form of user interface in which the user enters the names of commands to be executed, as well as associated arguments to specify the behavior of those commands. FIG. 10 illustrates one embodiment of the invention where command completion utilizing identifier resolution operation in accordance with the present invention when the given prefix is invalid.

Many computer systems store commands and files in a hierarchical fashion, meaning that some of the files are actually containers for other files. These special files are generally referred to as directories. The complete specification of a particular file in such a system consists of a combination of the name of the file itself, the name of the directory containing the file, the name of the directory containing that directory, and so forth. This combination of the names of the file and the directories that contain it is called a "file path". File paths can be specified from the highest directory down to the file, or specified relative to a default directory. These specifications are known as "absolute file paths" and "relative file paths", respectively.

A user enters an initial portion of a command, hereinafter referred to as a "prefix", which may include any portion of the file path associated with that command or file. In accordance with the present invention, the user can then request completion of the file path prefix, as shown at step 350. The system compares the entered prefix with files and their associated file paths as they are stored in memory, as determined at step 352. If any files include the entered prefix, it is determined 354 whether more than one files match the prefix. If only one file matches the prefix, the matching file is identified 356, and the possible completions to the prefix are displayed 370. If more than one file matches the prefix as determined at step 354, the prefix and any subsequent portion of the matching files that is common to all files is returned 358, and the possible completions are displayed 370.

If, however, the prefix provided by the user does not match any files as determined at step 352, the least significant portion of the file path is removed 360. In one embodiment of the invention, the portion is reduced to a single character, so that the least significant character of the file path is removed. If no characters are remaining at step 362 after removal of the least significant character, an indication of the invalidity of the requested file path prefix is returned 364, and processing ends. If any characters are remaining after removal of the least significant character, it is determined 366 whether files exist that match the modified file path prefix. If files match the modified file path prefix, an indication is returned 368 that the modified file path prefix is valid, and the possible completions to the file path are shown 370.

If it is determined at step 366 that no files exist that match the modified file path prefix, processing returns to step 360, where another character of the file path is removed. This file path resolution operation continues by removing file path characters, moving from the least significant character to the most significant character, until an indication is returned 368 that the modified file path prefix is valid, and the possible completions are displayed 370.

A command-line-driven application is defined by a non-interactive user interface. Typically, the application is used by typing its name, followed by any arguments to specify its behavior, at the prompt of a command shell. Often, one or more of the arguments which are supplied will be in the form of a file path. When given an invalid file path, current command-line-driven applications simply report that the path is invalid. The present invention will enter a identifier resolution operation upon detecting an invalid file path, as illustrated in FIG. 11.

Figure 11:
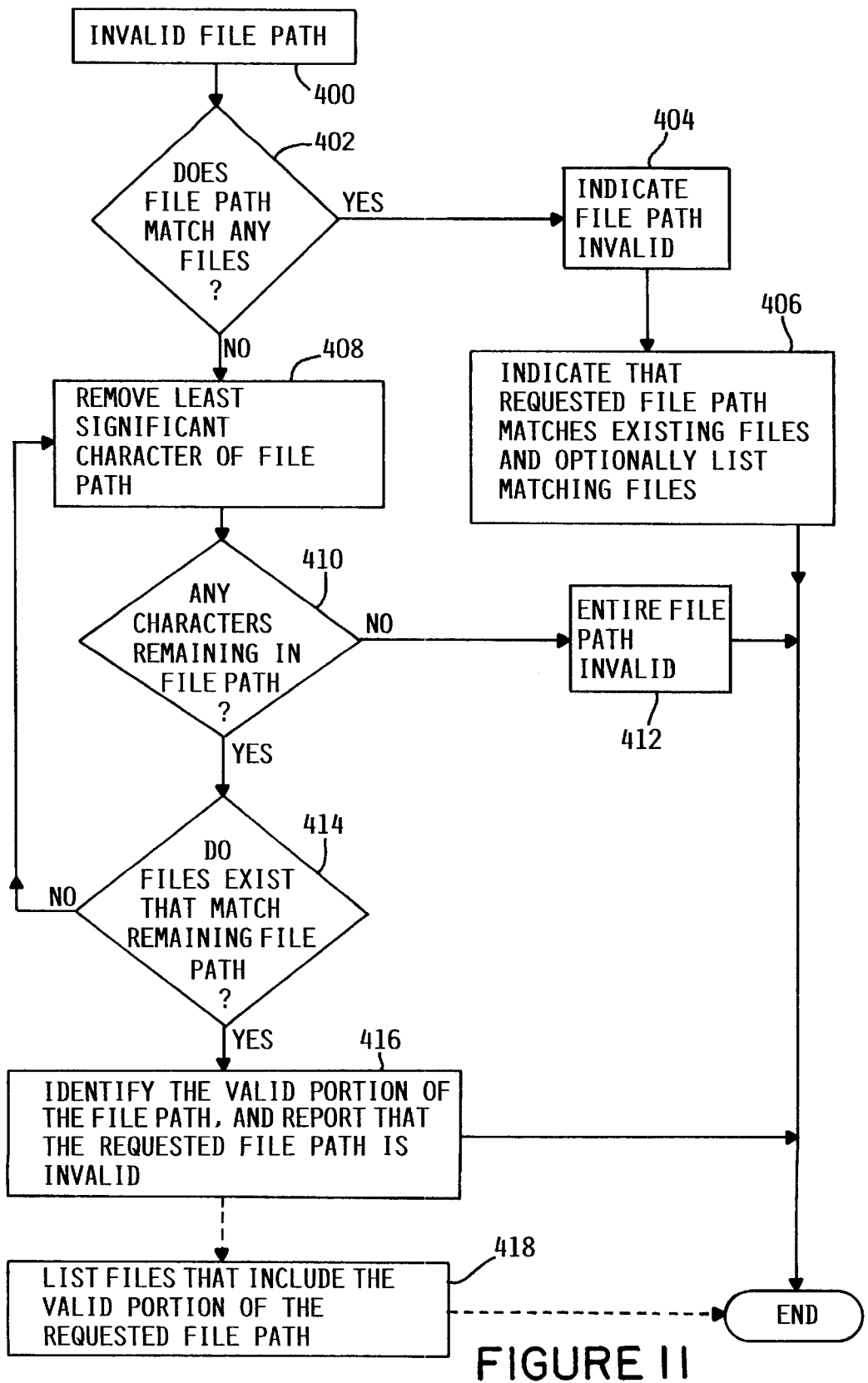
FIG. 11 is a flow diagram illustrating the manner in which a command-line-driven application performs a file path resolution operation in accordance with the present invention.

Referring now to FIG. 11, a flow diagram of an embodiment of the invention where a command-line-driven application performs a file path resolution operation in accordance with the present invention. Where the file path is determined to be invalid 400, the file path is compared to stored files to determine 402 whether any of the files match the file path provided. If so, it is indicated 404 that the file path is invalid, but also indicated 406 that a portion of the requested file path matches one or more of the existing files. Optionally, these matching existing files can be listed for the user to select a desired one of the existing files.

Where the file path does not match any of the files at step 402, the least significant character of the file path is removed 408. If no characters are remaining in the file path as determined at decision step 410, the entire file path is invalid 412, and processing ends. If characters are remaining after removal of the least significant character, the modified file path is compared to existing files to determine 414 whether the modified file path is included in any of the existing files. If so, the valid portion of the file path is identified, and the system reports that the requested file path is invalid, as illustrated at step 416. Optionally, the files that include the valid portion of the requested file path can be listed 418.

If it is determined at step 414 that no files exist that match the modified file path, processing returns to step 408, where the next least significant character of the file path is removed. The application performs this file path resolution operation until a valid portion is identified 416.

Hierarchical addresses are used to designate other structures as well as computer data structures. Some information, such as postal address information, may be resolved in accordance with another embodiment of the present invention. Such a system assumes the presence of a database, distributed or otherwise, capable of determining the validity of a postal address or any portion thereof. When a complete postal address is determined to be invalid, the system begins the address resolution process illustrated in FIG. 12.

Figure 12:
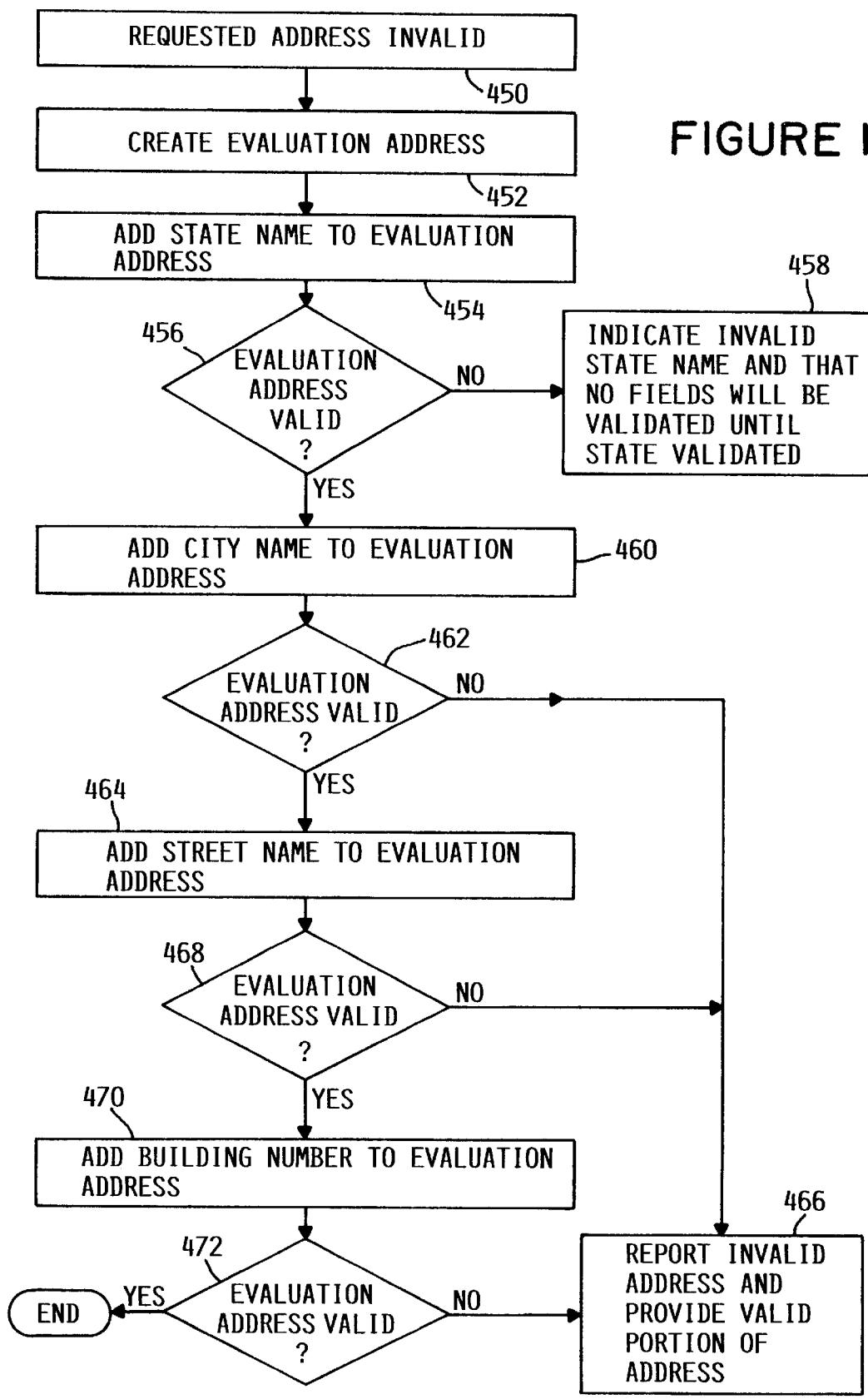
FIG. 12 is a flow diagram illustrating the manner in which a valid portion of a postal address can be resolved using a reversed-sequence address resolution process in accordance with the present invention.

The example of FIG. 12 assumes that the system implements postal addresses as a hierarchical system of five fields: addressee name, building or other structure number, street name, city, and state. A practical implementation of a database of valid postal addresses may require more resources to verify an address that is more specific. That is, the validity of a state name can be tested quite easily, while the validity of an addressee name requires much more effort to test. Therefore, this embodiment of the invention reverses the sequences of the address resolution method used in other described embodiments, by adding successive portions of the given address to the address that is used for validation.

Referring now to FIG. 12, a postal address resolution process in accordance with the present invention is provided. Where the requested address is deemed invalid 450, an evaluation address is created 452. The evaluation address is created field by field in a memory location. For example, the evaluation address is first created including only the most general (i.e., hierarchically highest) portion of the postal address. Therefore, the state name is added to the evaluation address first, as shown in step 454. The existing evaluation address is then checked for validity at step 456, by comparing the evaluation address to a list of valid state names or abbreviations. If the existing evaluation address is not valid, the system indicates 458 that the state name is invalid, and that no fields can be validated until this most general field is validated.

If the state name proves to be valid at step 456, the city name is added 460 to the evaluation address. If the evaluation address is valid, which now includes the state and the city, the street name is added to the evaluation address. Otherwise the invalid address is reported, and the valid portion of the address is provided at step 466. Therefore, the user is provided with the valid portion of the address, and the point at which the address was erroneous will become known.

Where the street name is determined to be invalid at step 468, the invalid address is reported, and the valid portion of the address is provided at step 466. Where the street name is valid, the building number can be added 470 to the evaluation address, and the evaluation address can again be checked for validity 472. At each stage, the valid portion of the address is provided at step 466.

Figure 13:
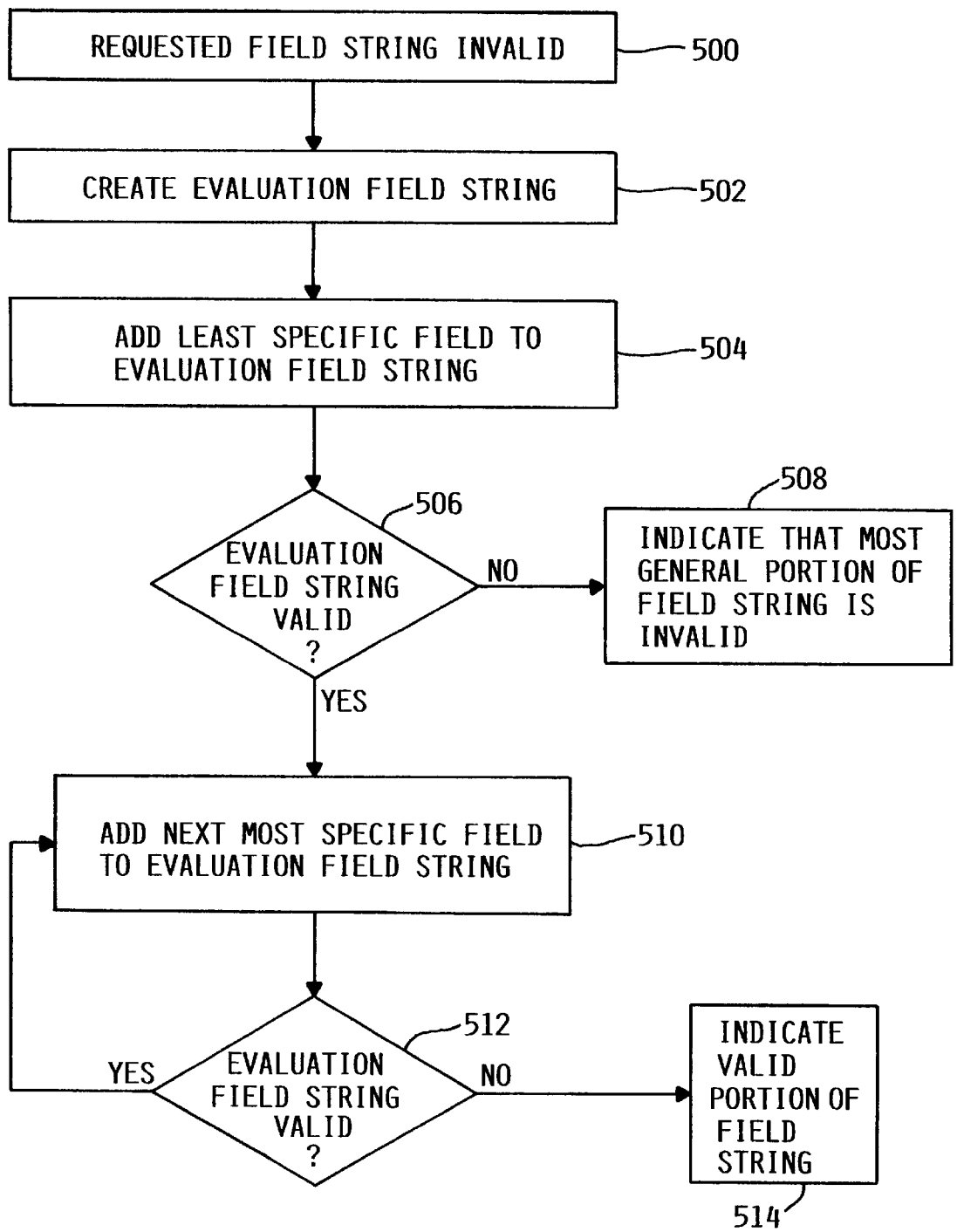
FIG. 13 is a flow diagram of a general embodiment of a reversed-sequence address resolution in accordance with the present invention.

FIG. 13 is a flow diagram of a general embodiment of the reversed sequence address resolution method. Other database structures other than postal addresses can be resolved by the present invention, as described in connection with FIG. 13. A requested field string is determined to be invalid 500, and an evaluation field string is created 502. The least specific field is added 504 to the evaluation field string, and the evaluation field string is checked for validity 506. If the evaluation field string is invalid, the system reports that the most general portion of the field string is invalid, as shown at step 508. Otherwise, if the evaluation field string is valid, the next most specific field is added 510 to the evaluation field string. If this modified evaluation field string is not valid as determined at step 512, the valid portion of the field string is reported 514 to the user. If the evaluation field string is valid, processing returns to step 510, where the next most specific field is again added to the evaluation field string. This reversed sequence resolution operation continues until the entire field string is determined to be valid, or until an invalid portion of the field string is identified, at which point the valid portion of the field string is identified to the user at step 514.

Figure 14:
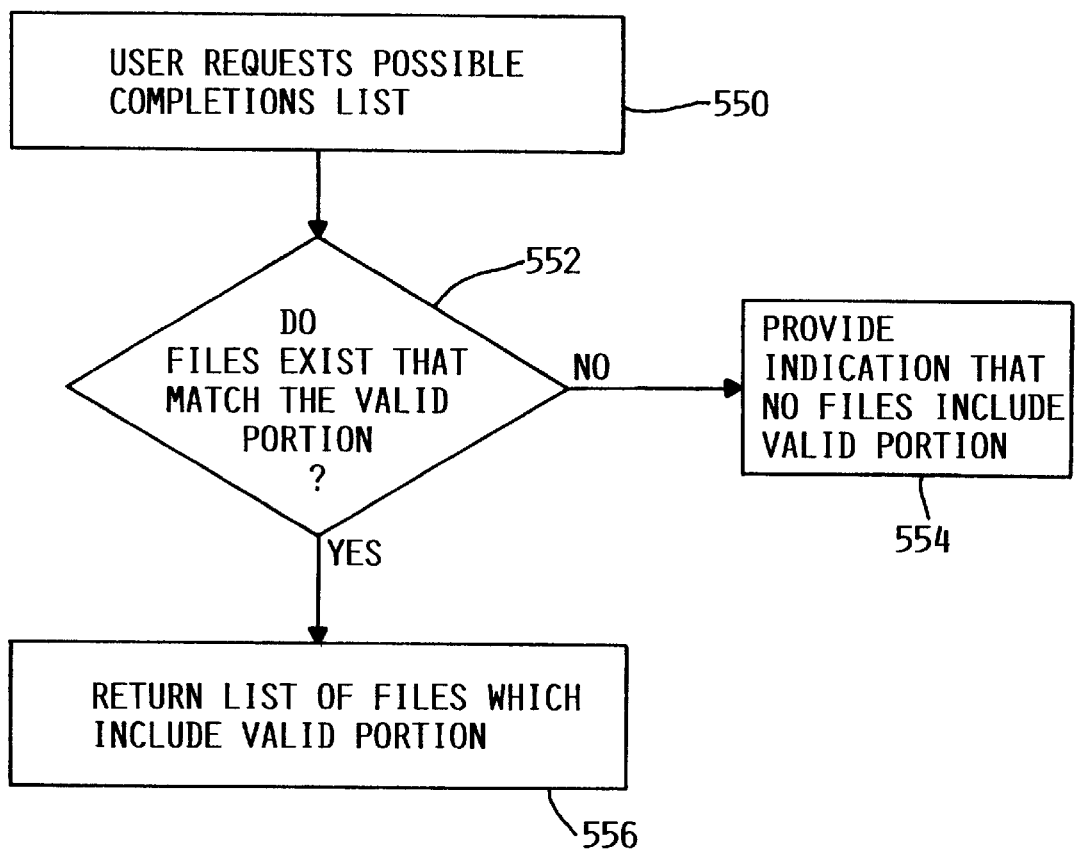
FIG. 14 is a flow diagram of the provision of a completions list in accordance with the present invention.

FIG. 14 is a flow diagram of an embodiment of the invention where a completions list is provided. Where an identifier resolution operation determines a valid portion of an identifier such as a file path or command name, the user may want to select from a list of possible file paths which match the valid portion of the entered file path or command name. Existing path/name completions merely post a message such as "No Match" if the path/name entered is invalid. The present invention enters an identifier resolution operation, and the possible completion list is provided from the "point of validity".

When this validity point is identified by the present invention, a completions list can be provided as shown in FIG. 14. A user requests 550 a possible completions list upon successful resolution of a valid portion of the particular type of identifier (e.g., file path, command name, URL, etc.). If no existing files match the valid portion as determined at step 552, an indication is provided 554 that no files include the valid portion. Otherwise, a list of the files which include the valid portion is returned to the user 556. This allows the user to select the desired file from a list of files, beginning at the point of validity entered by the user.

With enhanced completion, instead of using the entire path/name, only the portion of the name preceding the cursor would be used. This would be useful in conjunction with the file completion, where file completion would position the cursor to the right of the last valid position in the path/name. Keying a "Possible Completions" key would then show the list of what is possible. The user could also move the cursor to any desired location and request the possible completions at that point.

Referring now to FIG. 15, a system block diagram of a typical computing system 600, in which the present invention can be incorporated, is shown. A user computer 602 suitable for performing the functions in accordance with the present invention typically includes a central processor (CPU) 604 coupled to random access memory (RAM) 606 and read-only memory (ROM) 608. The processor 604 communicates with other internal and external components through input/output (I/O) circuitry and bussing 610. The computer 602 may also include one or more data storage devices, including hard and floppy disk drives 612 and a CD-ROM drive 614. In one embodiment, software containing application software, such as file management or command shell programs, may be stored and distributed on a CD-ROM 616, or a diskette 618, which may be inserted into, and read by, the CD-ROM drive 614 or the disk drive 612 respectively. The computer 602 is also coupled to a display 620, a user input interface 622 such as a mouse and keyboard, and a printer 624. The user typically inputs and modifies the desired resource identifiers by interfacing with the client computer 602 through the user interface 626, which interacts with user input interface 622 and display 620. The computer may optionally be connected to network server 628 in a local network configuration. The computer may further be part of a larger network configuration as in a global area network (GAN) such as the Internet. In such a case, the computer accesses one or more web servers 630 via an internet 632.

As noted above, the present invention provides a system and method for receiving and validating user input for a computer resource entered into a computing system or network, and for distinguishing valid and invalid portions of the user input. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A method for determining a valid portion of an invalid resource identifier entered by a user to access a computer resource in a computing system, wherein the resource identifier ranges from a least specific portion to a most specific portion, the method comprising:

determining whether the resource identifier entered by the user is invalid;

partitioning the invalid resource identifier entered by the user into a plurality of fields;

repeatedly removing at least one of the fields corresponding to the most specific portion of the invalid resource identifier to create modified resource identifiers, until one of the modified resource identifiers is a valid resource identifier; and distinguishing the valid resource identifier from the invalid resource identifier entered by the user.

2. The method of claim 1, wherein distinguishing the valid resource identifier comprises displaying the valid resource identifier on a user computer display screen in a manner visually distinguishable from the invalid resource identifier entered by the user.

3. The method of claim 2, wherein displaying the valid resource identifier comprises providing a visual depiction of the invalid resource identifier, and visually modifying the valid resource identifier within the invalid resource identifier.

4. The method of claim 3, wherein visually modifying the valid resource identifier comprises modifying characteristics of a text string corresponding to the valid resource identifier, wherein the characteristics of the text string are selected from the group comprising text fonts, text color, background color, text size, underlining, and reverse video.

5. The method of claim 2, wherein displaying the valid resource identifier comprises providing a visual depiction of the invalid resource identifier, and providing a visual cue at a boundary between the valid resource identifier and a remaining portion of the invalid resource identifier.

6. The method of claim 1, further comprising positioning a cursor in a text entry field at a boundary between the valid resource identifier and a remaining portion of the invalid resource identifier to allow the user to edit the invalid resource identifier from a point of validity.

7. The method of claim 1, wherein distinguishing the valid resource identifier comprises providing an audio indication of the valid resource identifier.

8. The method of claim 1, further comprising determining whether the modified resource identifier is the valid resource identifier each time the at least one of the fields is removed from the invalid resource identifier.

9. The method of claim 8, wherein determining whether the modified resource identifier is the valid resource identifier comprises comparing the modified resource identifier to stored computer resource identifiers, and determining whether the modified resource identifier matches any of the stored computer resource identifiers.

10. The method of claim 1, wherein partitioning the invalid resource identifier into a plurality of fields comprises assigning particular portions of the invalid resource identifier to each of the plurality of fields.

11. The method of claim 10, wherein assigning particular portions of the invalid resource identifier to each of the plurality of fields comprises assigning a plurality of textual characters of the invalid resource identifier to a particular one of the plurality of fields.

12. The method of claim 10, wherein assigning particular portions of the invalid resource identifier to each of the plurality of fields comprises assigning a single character of the invalid resource identifier to a particular one of the plurality of fields.

13. The method of claim 1, wherein determining whether the resource identifier entered by the user is invalid comprises comparing the resource identifier entered by the user to stored computer resource identifiers.

14. The method of claim 1, further comprising providing a selectable list of a plurality of available computer resource identifiers which include the valid resource identifier.

15. The method of claim 14, wherein providing a selectable list comprises providing the selectable list of the plurality of available resource identifiers from any point within the valid resource identifier which is designated by the user.

16. The method of claim 15, wherein providing the selectable list of the plurality of available resource identifiers from any point within the valid resource identifier comprises moving a visual designator to the point designated by the user.

17. A computing system for determining a valid portion of a desired resource identifier used to access a targeted computer resource, wherein the desired resource identifier has been determined to be invalid, the system comprising:
   a memory configured to store a plurality of system resource identifiers;
   a user interface to allow a user to enter the desired resource identifier;
   a processor which cooperates with the user interface to truncate predefined portions of the desired resource identifier until a resulting modified resource identifier is identified as a valid resource identifier included within at least one of the system resource identifiers; and
   a display device to display the valid resource identifier in relation to the desired resource identifier entered by the user.

18. The computing system as in claim 17, wherein the processor partitions the desired resource identifier into the predefined portions.

19. The computing system as in claim 17, wherein the user interface comprises a command shell, and wherein the desired resource identifier comprises a command character string including a command and any associated file directories and command arguments.

20. The computing system as in claim 19, wherein the processor partitions the command character string into the predefined portions, and wherein each of the commands, file directories, and command arguments corresponds to one of the predefined portions.

21. The computing system as in claim 19, wherein the processor partitions the command character string into the predefined portions, and wherein each character of the command character string corresponds to one of the predefined portions.

22. The computing system as in claim 17, wherein the user interface comprises a command-line-driven application, and wherein the desired resource identifier comprises a command character string including a command and any associated file directories and command arguments.

23. The computing system as in claim 17, wherein the user interface comprises a web browser for accessing information from the Internet, and wherein the desired resource identifier comprises a Uniform Resource Locator (URL).

24. The computing system as in claim 23, wherein the processor partitions the URL into the predefined portions, and wherein each of the URL directories, subdirectories, and filenames corresponds to one of the predefined portions.

25. The computing system as in claim 23, wherein the processor partitions the URL into the predefined portions, and wherein each of the characters of the URL corresponds to one of the predefined portions.

26. The computing system as in claim 23, wherein the processor partitions the URL into the predefined portions, and wherein each URL segment separated by delimiters corresponds to one of the predefined portions.

27. The computing system as in claim 23, wherein the web browser is configured and arranged to convert the valid resource identifier into a hypertext link.

28. The computing system as in claim 17, wherein the user interface further comprises a display window, and wherein the display device displays the valid resource identifier in the display window in a manner visually distinguishable from the desired resource identifier entered by the user.

29. The computing system as in claim 17, wherein:
   the user interface further comprises a display window; and
   the display device displays in the display window the valid resource identifier within the desired resource identifier, and displays a visual cue at a boundary between the valid resource identifier and a remaining portion of the desired resource identifier.

30. The computing system as in claim 17, wherein:
   the user interface comprises a text entry field to allow the user to enter the desired resource identifier; and
   the processor cooperates with the user interface to provide a text cursor in the text entry field at a boundary between the valid resource identifier and a remaining portion of the desired resource identifier to allow the user to edit the desired resource identifier from a point of validity.

31. A computing system for determining a valid portion of a desired Uniform Resource Locator (URL) used to access a targeted network resource, wherein the desired URL has been determined to be invalid, the computing system comprising:
   (a) a client computer comprising:
      (i) a user interface to allow a user to enter the desired URL; and
      (ii) a display device to display the desired URL;
   (b) a network server comprising:
      (i) a memory configured to store a plurality of available URLs; and
      (ii) a processor configured to identify the desired URL as an invalid URL, and to remove predefined portions of the invalid URL until a resulting modified URL is identified as a valid URL included within at least one of the available URLs.

32. The computing system as in claim 31, wherein the display device further distinguishably displays the valid URL within the desired URL entered by the user.

33. The computing system as in claim 32, wherein the processor is further configured to provide a user-selectable list of the plurality of available URLs which contain the valid URL to the user interface for display on the display device.

34. The computing system as in claim 31, wherein the processor is further configured to convert the valid URL into a hypertext link selectable by the user.

35. A method for determining a valid portion of an invalid database request entered by a user to access a computer database record in a computing system, wherein the database request ranges from a least specific portion to a most specific portion, the method comprising:
   partitioning the invalid database request into a plurality of fields;
   creating an evaluation field string;
   repeatedly introducing at least one of the fields corresponding to the least specific portion of the invalid database request into the evaluation field string, until a most recently introduced field invalidates the evaluation field string; and
   identifying a valid portion of the evaluation field string.

36. The method of claim 35, wherein identifying a valid portion of the evaluation field string comprises eliminating from the evaluation field string the most recently introduced field which invalidated the evaluation field string.

37. The method of claim 35, wherein the database request is a postal address.

38. The method of claim 37, wherein partitioning the invalid database request comprises partitioning the postal address into a plurality of fields selected from a group comprising a state name, a city name, a street name, a building identifier, a post office box identifier, an entity identifier, and a personal name.

39. A method for determining a valid portion of an invalid resource identifier entered by a user to access a computer resource in a computing system, wherein the resource identifier ranges from a least specific portion to a most specific portion, the method comprising the steps of:

(a) partitioning the invalid resource identifier entered by the user into a plurality of fields;

(b) removing the field corresponding to the most specific portion of the invalid resource identifier to create a modified resource identifier;

(c) determining whether the modified resource identifier is capable of accessing one of the computer resources in the computing system;

(d) distinguishably displaying the modified resource identifier from the invalid resource identifier entered by the user, if the modified resource identifier is capable of accessing one of the computer resources in the computing system; and repeating steps (b) and (c) until the modified resource identifier is capable of accessing one of the computer resources in the computing system.

40. A computer-readable medium having computer-executable instructions for performing steps comprising:

determining whether the resource identifier entered by the user is invalid;

partitioning the invalid resource identifier entered by the user into a plurality of fields;

repeatedly removing at least one of the fields corresponding to the most specific portion of the invalid resource identifier to create modified resource identifiers, until one of the modified resource identifiers is a valid resource identifier; and distinguishing the valid resource identifier from the invalid resource identifier entered by the user.

* * * * *